United States Patent [19]

Desai

[11] Patent Number: 5,739,188
[45] Date of Patent: Apr. 14, 1998

[54] THERMOPLASTIC POLYMER COMPOSITIONS WITH IMPROVED PROCESSABILITY AND METHOD OF PROCESSING

[76] Inventor: Nirav Desai, 2738 Roosevelt Blvd., Apt. 121, Clearwater, Fla. 34620

[21] Appl. No.: 524,262

[22] Filed: Sep. 6, 1995

Related U.S. Application Data

[63] Continuation-in-part of Ser. No. 323,522, Oct. 14, 1994, abandoned.

[51] Int. Cl.⁶ ................................................ C08K 5/09
[52] U.S. Cl. .......................... 524/140; 524/141; 524/285; 524/293; 524/450; 524/568; 524/569
[58] Field of Search ........................ 524/141, 285, 524/293, 450, 140, 568, 569

[56] References Cited

U.S. PATENT DOCUMENTS

| | | | |
|---|---|---|---|
| 2,867,605 | 1/1959 | Safford | 524/450 |
| 3,036,980 | 5/1962 | Dunham, Jr. et al. | 523/211 |
| 3,428,595 | 2/1969 | Tsukada et al. | 524/430 |
| 3,629,170 | 12/1971 | Yamanouchi et al. | 524/93 |
| 3,761,449 | 9/1973 | Kaufman | 528/174 |
| 3,869,420 | 3/1975 | Mathis et al. | 524/143 |
| 3,872,041 | 3/1975 | Koerber | 524/114 |
| 4,000,100 | 12/1976 | Baldyga | 524/147 |
| 4,029,618 | 6/1977 | Dieckmann | 524/177 |
| 4,060,508 | 11/1977 | Sugahara et al. | 523/440 |
| 4,116,907 | 9/1978 | Shiohara et al. | 524/83 |
| 4,162,226 | 7/1979 | Chatterji | 252/62.1 P |
| 4,211,853 | 7/1980 | Raley, Jr. | 524/80 |
| 4,231,922 | 11/1980 | Robeson | 524/371 |
| 4,250,081 | 2/1981 | Bode et al. | 524/450 |
| 4,307,010 | 12/1981 | Sandler et al. | 524/450 |
| 4,338,226 | 7/1982 | Worschech et al. | 524/302 |
| 4,371,656 | 2/1983 | Kashiwase et al. | 524/443 |
| 4,373,044 | 2/1983 | Buxbaum et al. | 524/132 |
| 4,376,178 | 3/1983 | Blount | 524/47 |
| 4,434,251 | 2/1984 | Sasajima et al. | 521/50.5 |
| 4,495,330 | 1/1985 | Chung et al. | 524/783 |
| 4,590,233 | 5/1986 | Erwied et al. | 524/357 |
| 4,593,059 | 6/1986 | Mesch et al. | 524/181 |
| 4,670,494 | 6/1987 | Semenza, Jr. | 524/141 |
| 4,686,255 | 8/1987 | Erwied et al. | 524/104 |
| 4,710,533 | 12/1987 | Neuman | 524/394 |
| 4,797,426 | 1/1989 | Waki et al. | 521/93 |
| 4,927,700 | 5/1990 | Nelson et al. | 428/209 |
| 5,004,776 | 4/1991 | Tadenuma et al. | 524/377 |
| 5,026,756 | 6/1991 | Arendt | 524/293 |
| 5,034,443 | 7/1991 | Bae et al. | 524/180 |
| 5,073,584 | 12/1991 | Meszaros et al. | 524/101 |
| 5,091,454 | 2/1992 | Arendt | 524/293 |
| 5,190,814 | 3/1993 | Foster et al. | 428/327 |
| 5,216,058 | 6/1993 | Visneski | 524/357 |
| 5,227,417 | 7/1993 | Kroushl, III | 524/114 |
| 5,234,981 | 8/1993 | Arfiche et al. | 524/265 |
| 5,256,717 | 10/1993 | Stauffer et al. | 524/293 |
| 5,350,785 | 9/1994 | Sander et al. | 524/100 |
| 5,599,856 | 2/1997 | Gardner | 523/453 |

FOREIGN PATENT DOCUMENTS

| | | | |
|---|---|---|---|
| 0529576 | 3/1993 | European Pat. Off. | B32B 27/18 |
| 1033540 | 6/1966 | United Kingdom . | |
| 1483659 | 8/1977 | United Kingdom . | |

OTHER PUBLICATIONS

Gachter/Muller Plastics Additvies pp. 192–249.
Modern Plastics Special Buyer's Cuide and Encyclopedia, Mid–Dec. 1992 Issue, vol. 69 No. 13.
Modern Plastics Encyclopedia 1982–1983, pp. 180–183.
Plastics Compounding May/Jun. 1990, pp. 48–49.
Modern Plastics Encyclopedia 1988, pp. 176–177.
Modern Plastics Encyclopedia 1982–1983, pp. 193–194 and 198.
Modern Plastics Encyclopedia 1988, pp. 168–169.
Solid Plasticizer in Reinforced Rigied Polyvinyl Chloride Resin, Master Thesis by Nirav N. Desai © Aug. 1993.

*Primary Examiner*—Vasu Jagannathan
*Assistant Examiner*—John J. Guarriello
*Attorney, Agent, or Firm*—Hedman, Gibson & Costigan P.C.

[57] ABSTRACT

A thermoplastic composition comprising: (i) a thermoplastic resin; (ii) an antiplasticizing amount of a solid plasticizer; (iii) optionally an acid scavenger; and (iv) optionally a heat stabilizer selected from the group consisting of mixed metal stabilizers, organotin stabilizers, lead stabilizers, metal free stabilizers, or any combination of the foregoing which improves the processability of the thermoplastic resin without affecting the physical properties of the thermoplastic resin.

8 Claims, No Drawings

THERMOPLASTIC POLYMER COMPOSITIONS WITH IMPROVED PROCESSABILITY AND METHOD OF PROCESSING

This application is a continuation-in-part of U.S. patent application Ser. No. 08/323,522, filed Oct. 14, 1994, now abandoned.

FIELD OF THE INVENTION

This invention relates to thermoplastic polymer compositions, preferably halogen containing organic polymers, with improved processing stability and reduced melt viscosity and a method for processing the compositions. The compositions of the present invention comprise a thermoplastic polymer and an antiplasticizing amount of a solid plasticizer to reduce the melt viscosity (improve the flow characteristics of the composition). The composition may also comprise an acid scavenger to further stabilize against thermal decomposition. The thermoplastic compositions prepared in accordance with the present invention do not exhibit any significant change in their impact, mechanical e.g. tensile and flexural properties, and thermal properties.

BACKGROUND OF THE INVENTION

It is well known in the art of compounding that plasticizers such as those described on pages 401–410 of the 1993 edition of Modern Plastics Encyclopedia impart flexibility, softness and extensibility to inherently rigid thermoplastic resins. The addition of a plasticizer to a thermoplastic resin generally reduces the melt viscosity and lowers the temperature of second order transition.

It is believed that plasticizers function by lowering the intermolecular forces of the polymer chains. More specifically, it is believed that plasticizers exhibit plasticizing effect by converting polymer-polymer hydrogen bonds to polymer-plasticizer hydrogen bonds thereby raising polymer chain mobility.

The lowering of intermolecular forces results in lower glass transition temperature of the polymer. This results in lowered heat deflection temperature and reduced mechanical properties such as tensile strength and flexural modulus.

A decrease in hardness, heat deflection temperature, flexural modulus and tensile strength is not always desirable, especially in situations where the thermoplastic resin is selected for its high heat deflection temperature and rigidity.

It is also known in the art that heat stabilization is important for thermoplastics especially halogen containing thermoplastic resins like PVC and CPVC, whose processing temperature and thermal degradation temperature only differ by a few degrees making slight processing variations detrimental.

Various chemical compounds and compositions have been developed to stabilize halogen containing polymers against heat deterioration. Some of the heat stabilizers which are commercially available are described in various trade publications and reference materials such as the 1993 Modern Plastics Encyclopedia and Plastics Additives Handbook, edited by R. Gachter and H. Muller, Hanser Publishers© 1983, pp. 204–230 which are incorporated herein by reference.

The more common heat stabilizers are organotin compounds such as mono and dialkyltin carboxylates, mono and dialkyltin mercaptides, mixed metal stabilizers such as barium, cadmium, barium/zinc or cadmium/zinc salts of carboxylic acids and phenols, lead stabilizers such as tribasic lead sulfate, dibasic lead phosphite, dibasic lead phthalate, dibasic lead stearate, dibasic lead carbonate and lead stearate and metal free stabilizers such as 2-phenylindole and aminocrotonates.

Other compounds such as antimony-tris-mercaptides can be used to stabilize halogen containing organic polymers but these compounds have gained only modest importance in the art.

It is also known in the art to use costabilizers to enhance the stability of halogen containing organic polymers. Some common costabilizers are organic phosphites such as diphenyl-decylphosphite and phenyl-didecylphosphite, epoxy compounds such as epoxidized soybean oil, epoxidized castor oil and epoxidized linseed oil, polyols such as pentaerythritol, dipentaerythritol, trismethylolpropane and sorbital, and antioxidants such as bisphenol A, 2,6-di-tertbutyl-4-methylphenol and octadecyl 3(3,5-di-tertbutyl-4-hydroxyphenyl)propionate. Other costabilizers or stabilizer enhancers are described in U.S. Pat. Nos. 4,593,059, 5,073,584, 4,060,508, 5,234,981, and applicant's copending United States patent applications entitled Acid Scavenger Stabilized Halogen Containing Polymers filed on Aug. 4, 1994 and assigned Ser. No. 08/285,989 and Acid Scavenger Stabilized Halogen Containing Polymers and Method for Processing filed on Aug. 17, 1995. The aforementioned patents are incorporated herein by reference.

Other costabilizers known in the art are molecular sieves or zeolite compounds. For example U.S. Pat. No. 4,000,200, incorporated herein by reference, discloses the use of Zeolite A molecular sieves which have approximately 18–25% water content with conventional inorganic, organometallic or organic stabilizers. Unfortunately, the high water content of these zeolite compounds often evaporates during processing which results in an unwanted orange peel product or product with a grainy finish. A further disadvantage of using zeolites as a stabilizer for halogen polymers is that many of the zeolites incorporate sodium which can impart an undesirable reddish color to the polymer product.

With the increased use of thermoplastic resins like CPVC that have high heat of deflection temperatures (high service temperature), high glass transition temperature and outstanding mechanical, low flame and smoke properties, it has become increasingly important to develop a system or composition with improved processability and process stability.

SUMMARY OF THE INVENTION

It is therefore an objective of the present invention to provide a thermoplastic composition with improved processability without adversely affecting the mechanical and thermal properties of the thermoplastic composition.

It is another objective of the present invention to provide a heat stabilized thermoplastic composition that does not deteriorate during melt processing due to thermal degradation.

It is an additional objective of the present invention to provide a prepackaged composition that can be added to thermoplastic resins during compounding (formulation) and will produce a composition with the aforementioned objectives.

It is still a further objective of the present invention to provide a method for processing the heat stabilized thermoplastic composition which results in a product that has a smooth uniform finish.

Accordingly, the present invention is a thermoplastic composition comprising: (i) a thermoplastic resin and (ii) an antiplasticizing amount of a solid plasticizer. The invention may also contain an acid scavenger and a heat stabilizer selected from the group consisting of mixed metal stabilizers, organotin stabilizers, lead stabilizers, metal free stabilizers, or any combination of the foregoing.

The present invention also encompasses a method for processing the above-described stabilized composition comprising: (a) formulating a first stabilized halogen containing organic polymer composition comprising: (i) a halogen containing organic polymer; (ii) an antiplasticizing amount of a solid plasticizer (iii) an acid scavenger comprising a molecular sieve or zeolite; and (iv) a heat stabilizer selected from the group consisting of mixed metal stabilizers, organotin stabilizers, lead stabilizers, metal free stabilizers, or any combination of the foregoing; (b) formulating a second stabilized halogen containing organic polymer composition comprising: (i) a halogen containing organic polymer; (ii) a heat stabilizer selected from the group consisting of mixed metal stabilizers, organotin stabilizers, lead stabilizers, metal free stabilizers, antimony-tri-mercaptides, organic phosphates, epoxy compounds, polyols, dicarboxylic acids, aminocrotonates or any combination of the foregoing; and (iii) optionally, an antiplasticizing amount of a solid plasticizer; and (c) processing the first and second stabilized compositions to form a multi-layered product wherein the first composition forms a core or substrate layer for the product and the second composition forms a cap or cover layer for the core layer.

The cover layer is thinner than the core layer and is designed to correct or mask the visual defects such as reddish color and/or the orange peel appearance that results from the use of the molecular sieve in the first composition which forms the core layer. The cover layer may be present on one or both sides of the core layer depending upon the type of product being formed.

In a preferred embodiment, the method for processing a stabilized halogen polymer comprises coextruding the first composition and the second composition so that the core of the extruded and molded product comprises from about 50 to about 99 weight percent of the product, preferably from about 70 to about 95 weight percent of the product and the cap comprises from about 1 to about 50 weight percent of the product, preferably from about 5 to about 30 weight percent of the product.

The first composition and the second composition may also further comprise, costablizers, plasticizers, lubricants, smoke suppressants, impact modifiers, UV stabilizers, fillers, pigments or any combination of the foregoing.

DETAILED DESCRIPTION OF THE INVENTION

Any thermoplastic resin commonly known in the industry may be used in the present invention but the preferred thermoplastic resins are halogen containing organic polymer resins such as polyvinyl chloride, polyvinylidene chloride, polyvinyl bromide, polyvinyl fluoride, polyvinylidene fluoride, copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate, and other alkyl methacrylates, methyl alpha-chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene and polymer blends such as blends of polyvinyl chloride and polyethylene, polyvinyl chloride and chlorinated polyethylene, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate.

The most preferred thermoplastic resins are selected from the group consisting of polyvinyl chloride homopolymers, vinylchloride copolymers, chlorinated polyvinyl chloride homopolymers, chlorinated polyvinyl chloride copolymers and any combination of the foregoing.

Solid plasticizers have melting points above room temperature and melt during processing to impart plasticizing effects similar to liquid plasticizer systems. However, solid plasticizers solidify again at room temperature and thus do not soften the final properties of the compound. The final compound remains rigid without any significant changes in end-use properties. Some representative solid plasticizers are tri phenyl phosphate, commercially available from Monsanto company, and benzoate compounds such as described in U.S. Pat. Nos. 5,256,717; 5,026,756; and 5,091,454 incorporated herein by reference. In order to retain the heat deflection temperature, the solid plasticizer should ideally have a melting temperature as close to the processing temperature of the thermoplastic resin as possible.

As discussed earlier, addition of a plasticizer in a polymer composition softens the properties. However, in some thermoplastic materials such as PVC, addition of small amounts of plasticizer produce a general "hardening" property. This is known as "antiplasticization". The antiplasticizing amount of a solid plasticizer is defined as the amount of solid plasticizer sufficient to improve the processability of the thermoplastic resin or composition but not enough of the solid plasticizer to cause a significant decrease in mechanical properties such as heat deflection temperature. Typically the antiplasticizing amount of a solid plasticizer is about 10 percent of the total weight of the composition or less, preferably about 5 percent of the total weight of the composition and most preferred less than 3 percent of the total weight of the composition.

The process stability of the subject invention can be further enhanced by adding an acid scavenger and a heat stabilizer to the thermoplastic resin and solid plasticizer composition.

Acid scavengers are a class of compounds that react with acids to form a compound that is chemically inert. Typically, an acid scavenger is slightly basic or amphoteric and will absorb the acid that is given off during degradation of the halogen containing organic polymer and form an innocuous salt without detracting from the final cured properties of the polymer.

Some common acid scavengers are magnesium hydroxide, sodium aluminum carbonate, zinc borate, calcium carbonate, calcium silicates, lead silicates, zinc silicates, magnesium silicates, alkali metal alumo silicates, amorphous basic aluminum magnesium carbonate or any combination of the foregoing. These acid scavengers are described in U.S. Pat. Nos. 5,190,814; 5,234,981; 5,073,584; 4,060,508; 4,927,700; and in "Color Stability of Rigid PVC with Molybdates", *Plastics Compounding*, May/June 1990, pp. 48–49 which are incorporated herein by reference.

Any acid scavenger or combination of acid scavengers may be used in the present invention but the preferred acid scavengers are molecular sieves or zeolites such as those described in U.S. Pat. Nos. 4,000,100 and 4,371,656. The most preferred acid scavengers are sodium zeolites, particularly sodium mordenites, which have about 13 to 25% water content, a mean particle size of about 3 to 4 microns, an average pore size of about 1 to about 15 angstroms, preferably, about 3 to about 7 angstroms.

The acid scavenger is present in an amount of about 0.05% to about 12% of the total weight of the composition, preferably from about 0.4% to about 7% and most preferably from about 0.8% to about 5%.

Any of the known heat stabilizers may be used in the present invention. Preferred heat stabilizers comprise organotin compounds such as mono and dialkyltin carboxylates, mono and dialkyltin mercaptides, mixed metal stabilizers such as barium, cadmium, barium/zinc or cadmium/zinc salts of carboxylic acids and phenols, lead stabilizers such as tribasic lead sulfate, dibasic lead phosphite, dibasic lead phthalate, dibasic lead stearate, dibasic lead carbonate and lead stearate and metal free stabilizers such as 2-phenylindole and aminocrotonates.

The more preferred heat stabilizers for use in the present invention are the organotin stabilizers described in U.S. Pat. No. 4,593,059, while the most preferred organotin stabilizers are methyl tin, ethyl tin, propyl tin and butyl tin.

The heat stabilizer is present in an amount of about 0.2% to about 12% of the total weight of the composition, preferably from about 0.4% to about 7% and most preferably from about 0.8% to about 5%.

Costabilizers may also be employed in the present invention as well as usual adjuvants such as phenolic antioxidants, anti-UV agents such as benzophones, benzotriazoles or stearically hindered amines, impact modifiers such as acrylate/butadiene/styrene and pigments or dyes.

The present invention may also comprise smoke suppressant agents such as ammonium octamolybdate, commercially available from Climax Performance Materials Corporation, Norwalk, Conn. If a smoke suppressant is employed in the present invention it is preferred that the smoke suppressant be formulated with the first stabilized halogen polymer because ammonium octamolybdate can turn the halogen polymer light blue in color upon exposure to high humidity and/or UV light. It has been known in the industry to coextrude PVC compounds where the smoke suppressant is present in the core or substrate layer and not in the top coat or cap layer in order to protect the PVC sheet from UV radiation which could turn the product a blue color.

The present invention can be formulated by dispersing the solid plasticizer, the acid scavenger and heat stabilizer concurrently or separately with thermoplastic resin by any conventional manner such as mixing, blending, stirring or shaking. In normal commercial practice the solid plasticizer, acid scavenger, heat stabilizer and any other desired additives are dispersed in the thermoplastic resin prior to pelletizing and when the polymer is in the powder form.

The solid plasticizer, acid scavenger, and heat stabilizer may be premixed and packaged in amounts that will allow a formulator to added the premixed package to a known amount of thermoplastic resin resulting in a composition in accordance with the present invention.

The thermoplastic compositions of this invention may be processed by any of the polymer processing techniques commonly used in the industry such as injection molding, blow molding, rotational molding and specifically sheet extrusion.

The combination of the solid plasticizer, acid scavenger and heat stabilizer produces a composition of halogen containing thermoplastic resin that has remarkable dynamic thermal stability, high flow with reduced melt viscosity and generally increased processing rates. The other added advantage is the ability of such compositions to be processed at a higher processing temperature with minimum chances of thermal degradation.

DETAILED DESCRIPTION OF A PREFERRED EMBODIMENT

The present invention will be further described in detail by reference to the following examples. The examples are for illustration and are not intended to limit the scope of the invention.

EXAMPLE 1

A composition in accordance with the present invention is prepared by mixing 100 phr (parts per hundred parts of resin) of a chlorinated polyvinyl chloride resin commercially available from B F Goodrich under the trade name 677x670; 7 phr of 1,4-cyclohexane dimethanol dibenzoate which is a solid plasticizer commercially available from Velsicol Chemical Corporation under the trade name Benzoflex® 352; 4 phr of a methyl tin heat stabilizer commercially available from Morton Internationals under the trade name TM-181; 21 phr of a heat distortion modifier commercially available from Rohm & Haas Company under the trade name HT-510; 24 phr of a chlorinated polyethylene impact modifier commercially available from Dow Chemical under the trade name TYRIN 3615P; 8.75 phr of a white pigment ($TiO_2$) commercially available from Kerr McGee Chemical Corp. under the trade name CR-834; 2 phr of a lubricant commercially available from Allied Signal under the trade name AC 629A; 0.5 phr of a lubricant commercially available from Hoechst Co. under the trade name E WAX; and 0.75 phr of carbon black in a Henschel high intensity mixer for 8–10 minutes.

The CPVC 677x670 has 67% chlorine by weight, a K value of 56.8, an inherent viscosity of 0.68, a specific gravity of 1.57, average particle size of 118 microns and a glass transition temperature of 130° C.

39 grams of the resulting mixture is tested for process stability by placing the dry blend into a brabender and recording the dynamic thermal stability time and torque. This method is a convenient method to determine the time required to crosslink the compound. The brabender is preheated to 190° C. and run at 35 rpms.

A portion of the composition is pressed into 40 mil thick sheets using at a temperature of 350° F. and 2000 psi. The sheet is then cut into a 2"x6" test sample and placed in an oven on a wooden block with a 45° notch in the center of the block. The temperature of the oven is raised by 5° F. every 5 minutes to allow the test sample to equilibrate with the oven temperature. The temperature at which the test sample begins to bend and sag is reported in Table 1. The results of this sag test are similar to ASTM D 1525 for measuring vicat softening point.

The results of the tests are reported in Table 1.

EXAMPLE 2

A composition in accordance with the present invention is prepared according to the procedure outlined in Example 1 except that 2 phr of an acid scavenger commercially available from Synthetic Products Co. (SYNPRO) of Cleveland, Ohio under the trade name SYNPRON AH-42 is added to the composition during blending. The composition is tested according to the procedures outlined in Example 1. The results are reported in Table 1.

COMPARATIVE EXAMPLE 1

A composition not in accordance with the present invention is prepared by mixing 100 phr of a chlorinated polyvinyl chloride resin commercially available from B F Goodrich under the trade name 677×670; 4 phr of a methyl tin heat stabilizer commercially available from Morton Internationals under the trade name TM-181; 21 phr of a heat distortion modifier commercially available from Rohm & Haas Company under the trade name HT-510; 24 phr of a chlorinated polyethylene impact modifier commercially available from Dow Chemical under the trade name TYRIN 3615P; 8.75 phr of a white pigment ($TiO_2$) commercially available from Kerr McGee Chemical Corp. under the trade name CR-834; 2 phr of a lubricant commercially available from Allied Signal under the trade name AC 629A; 0.5 phr of a lubricant commercially available from Hoechst Co. under the trade name E WAX; and 0.75 phr of carbon black in a Henschel high intensity mixer for 8–10 minutes.

The CPVC 677×670 has 67% chlorine by weight, a K value of 56.8, an inherent viscosity of 0.68, a specific gravity of 1.57, average particle size of 118 microns and a glass transition temperature of 130° C.

The composition is tested according to the procedures outlined in Example 1. The results are reported in Table 1.

COMPARATIVE EXAMPLE 2

A composition not in accordance with the present invention is prepared according to the procedure outlined in Comparative Example 1 except that 2 phr of an acid scavenger commercially available from Synthetic Products Co. under the trade name SYNPRON AH-42 is added to the composition during blending. The composition is tested according to the procedures outlined in Example 1. The results are reported in Table 1.

TABLE 1

| EXAMPLE NO. | EQUILIBRIUM TORQUE m-gms | DTS TIME mins | OVEN TEMP. SAG |
|---|---|---|---|
| 1 | 1550 | 15–16 | 227° F. |
| 2 | 1550 | 32 | 226° F. |
| 1* | 2050 | 11–12 | 236° F. |
| 2* | 2000 | 21 | 235° F. |

*comparative examples

The results of Table 1 show that the compositions prepared in accordance with the present invention exhibit a lower melt viscosity and greater dynamic thermal stability than compositions not prepared in accordance with the invention.

It is believed that the lower melt viscosity of compositions prepared in accordance with the present invention is the result of the solid plasticizer melting and thereby converting the polymer-polymer hydrogen bonds to polymer-plasticizer hydrogen bonds. Polymer-plasticizer hydrogen bonding results in greater processing ease.

It is also believed that the greater dynamic thermal stability is caused by the plasticizing effect of the plasticizer. Specifically, the solid plasticizer melts during processing and imparts a plasticizing effect to the composition by lowering the melt viscosity and shear of the composition. The lower melt viscosity of the composition increases the time required for the thermoplastic resin to cross-link or decompose thereby increasing the dynamic thermal stability time.

The dramatically improved dynamic thermal stability of Example 2, which is a composition prepared in accordance with the present invention, is due to the synergistic effect of the acid scavenger. It is believed that the acid scavenger functions by neutralizing any HCL emitted during processing of the CPVC. The evicted acid is thus immediately converted to an innocuous state by the acid scavenger allowing the tin stabilizer to further stabilize the composition.

EXAMPLE 3

A composition in accordance with the present invention is prepared by mixing 100 phr (parts per hundred parts of resin) of a chlorinated polyvinyl chloride resin commercially available from B F Goodrich under the trade name 677×670; 4 phr of 1,4-cyclohexane dimethanol dibenzoate which is a solid plasticizer commercially available from Velsicol Chemical Corporation under the trade name Benzoflex® 352; 2 phr of an acid scavenger commercially available from Synthetic Products Co. under the tradename SYNPRON AH-42; 4 phr of a methyl tin heat stabilizer commercially available from Morton Internationals under the trade name TM-181; 21 phr of a heat distortion modifier commercially available from Atohass Company under the trade name V8-25; 24 phr of a chlorinated polyethylene impact modifier commercially available from Dow Chemical under the trade name TYRIN 3615P; 8.75 phr of a white pigment ($TiO_2$) commercially available from Kerr McGee Chemical Corp. under the trade name CR-834; 2 phr of a lubricant commercially available from Allied Signal under the trade name AC 629A; 0.5 phr of a lubricant commercially available from Hoechst Co. under the trade name E WAX; and 0.75 phr of carbon black in a Henschel high intensity mixer for 8–10 minutes.

The CPVC 677×670 has 67% chlorine by weight, a K value of 56.8, an inherent viscosity of 0.68, a specific gravity of 1.57, average particle size of 118 microns and a glass transition temperature of 130° C.

The composition is tested according to the procedures outlined in Example 1. In addition, the flexural modulus of the composition is determined by ASTM D 670, the tensile strength of the composition is determined according to ASTM D 638 and the notched izod impact strength of the composition is determined by ASTM D 256. The results are reported in Table 2.

COMPARATIVE EXAMPLE 3

A composition not in accordance with the present invention is prepared by mixing 100 phr (parts per hundred parts of resin) of a chlorinated polyvinyl chloride resin commercially available from B F Goodrich under the trade name 677×670; 4 phr of a methyl tin heat stabilizer commercially available from Morton Internationals under the trade name TM-181; 21 phr of a heat distortion modifier commercially available from Atohass Company under the trade name V8-25; 24 phr of a chlorinated polyethylene impact modifier commercially available from Dow Chemical under the trade name TYRIN 3615P; 8.75 phr of a white pigment ($TiO_2$) commercially available from Kerr McGee Chemical Corp.

under the trade name CR-834; 2 phr of a lubricant commercially available from Allied Signal under the trade name AC 629A; 0.5 phr of a lubricant commercially available from Hoechst Co. under the trade name E WAX; and 0.75 phr of carbon black in a Henschel high intensity mixer for 8–10 minutes.

The CPVC 677×670 has 67% chlorine by weight, a K value of 56.8, an inherent viscosity of 0.68, a specific gravity of 1.57, average particle size of 118 microns and a glass transition temperature of 130° C.

The composition is tested according to the procedures outlined in Example 3. The results are reported in Table 2.

TABLE 2

|  | EXAMPLE 3 | COMPARATIVE EXAMPLE 3 |
| --- | --- | --- |
| TENSILE STRENGTH @ YIELD (psi) | 12,085 | 11,713 |
| FLEXURAL STRENGTH (psi) | 10,211 | 9,389.34 |
| FLEXURAL MODULUS (psi) | 483,378.37 | 439,523.37 |
| EQUILIBRIUM TORQUE (m-gms) | 1,500 | 1,850 |
| DYNAMIC THERMAL STABILITY (mins.) | 32 | 15–16 |
| OVEN TEMP. SAG (°F.) | 217 | 226 |
| NOTCHED IZOD IMPACT (⅛" sample) (Ft-lbs/in) | 1,.51 | 1.79 |

The results reported in Table 2 show that compositions prepared in accordance with the present invention exhibit lower melt viscosity (i.e. are easier to process) and greater dynamic thermal stability with some gain in tensile strength, flexural strength and modulus. The loss in oven sag resistance and impact strength can be regained with some modification if desired. It is believed these results are due to the antiplasticization phenomenon in which small amounts of plasticizer produce a general "hardening" of properties contrary to the function of a plasticizer.

EXAMPLE 4

A test method for processing the stabilized halogen containing polymers in accordance with the present invention is conducted by formulating approximately 840 lbs of a composition as described in Example 1 and formulating approximately 835 lbs of a composition as described in Example 3. The compositions are coextruded using a CM 55 and CM 80 twin screw extruder commercially available from the Cincinnati Milacron Company. The product is extruded through a single feed block die into a sheet form.

The formulation of Example 3 which contains an acid scavenger is extruded in CM 80 with a barrel temperature profile of 295°-305°-315°-325° F., die temperature of 350° F., extruder amps of 80–82 and screw thrust of approximately 30%.

The formulation of Example 1 which does not contain an acid scavenger is extruded in CM 55 with a barrel temperature profile of 280°-290°-300°-310° F., die temperature of 350° F., extruder amps of 28–30 and screw thrust of 40–42%.

The feed block die is maintained at a temperature of 335° F. and has a die size of 44 inches.

This coextrusion process results in a sheet that is approximately 70% core or substrate layer wherein the core comprises the formulation of Example 3 and approximately 30% cap or cover layer wherein the cap comprises the formulation of Example 1.

The final sheet product exhibits all the beneficial properties imparted by the antiplasticizing amount of the solid plasticizer and a zeolite stabilized product without exhibiting the aesthetically unacceptable properties such as an orange peel appearance or a reddish color. The final sheet product also has the additional advantage of allowing the formulator to reduce the amount of expensive tin stabilizer employed in the final product resulting in a reduction in the cost of the final product base on productivity.

COMPARATIVE EXAMPLE 4

A method for processing halogen containing polymers not in accordance with the present invention is conducted by formulating approximately 805 lbs of a composition as described in Comparative Example 1. This composition was used for coextrusion through CM 55 and CM 80 twin screw extruder as described in example 4. However, it was not possible to coextrude the composition of Comparative Example 1. The melt viscosity of the composition was very high and it generated screw thrust beyond the processing capabilities of CM 55. Moreover, the poor process stability of the composition made it susceptible to thermal degradation, thereby increasing the chances of damaging the extruder and die.

Although the present invention has been described in detail and with reference to specific embodiments, it will be apparent to one of ordinary skill in the art that various changes and modifications can be made herein without departing from the spirit and scope thereof.

All the above mentioned patents, publications and test methods are herein incorporated by reference.

I claim:

1. A thermoplastic composition consisting essentially of:

(i) a chlorine containing organic polymer selected from the group consisting of polyvinyl chloride, polyvinylidene chloride, polyvinyl chloride homopolymers, vinyl chloride copolymers, chlorinated polyvinyl chloride homopolymers, chlorinated polyvinyl chloride copolymers, and any combination of the foregoing;

(ii) an antiplasticizing amount of 1,4-cyclohexane dimethanol dibenzoate which is less than 3% of the total weight of the composition but more than zero weight percent;

(iii) a sodium zeolite with about 13 to 25% water content, a mean particle size of about 3 to 4 microns and an average pore size of about 3 to about 7 angstroms;

(iv) a heat stabilizer selected from the group consisting of mixed metal stabilizers, organotin stabilizers, lead stabilizers, metal free stabilizers, or any combination of the foregoing; and (v) costablizers, plasticizers, lubricants, smoke suppressants, impact modifiers, UV stabilizers, fillers, pigments or any combination of the foregoing.

2. A composition as defined in claim 1 wherein the amount of the 1,4-cyclohexane dimethanol dibenzoate is less than 3% of the total weight of the composition but more than 2% of the total weight of the composition.

3. A composition as defined in claim 1 wherein the amount of the 1,4-cyclohexane dimethanol dibenzoate is about 2.4% of the total weight of the composition.

4. A method for processing a stabilized chlorine containing organic polymer composition comprising:

(a) formulating a first stabilized chlorine containing organic polymer composition comprising: (i) a chlorine containing organic polymer selected from the group consisting of polyvinyl chloride, polyvinylidene chloride, polyvinyl chloride homopolymers, vinyl chloride copolymers, chlorinated polyvinyl chloride homopolymers, chlorinated polyvinyl chloride copolymers and any combination of the foregoing; (ii) an antiplasticizing amount of 1,4-cyclohexane dimethanol dibenzoate which is less than 3% of the total weight of the composition but more than zero weight percent; (iii) a sodium zeolite with about 13 to 25% water content, a mean particle size of about 3 to 4 microns and an average pore size of about 3 to about 7 angstroms; and (iv) a heat stabilizer selected from the group consisting of mixed metal stabilizers, organotin stabilizers, lead stabilizers, metal free stabilizers or any combination of the foregoing;

(b) formulating a second stabilized halogen containing organic polymer composition comprising: (i) a halogen containing organic polymer; (ii) a heat stabilizer selected from the group consisting of mixed metal stabilizers, organotin stabilizers, lead stabilizers, metal free stabilizers, antimony-tris-mercaptides, organic phosphates, epoxy compounds, polyols, dicarboxylic acids, aminocrotonates or any combination of the foregoing; and (iii) optionally an antiplasticizing amount of a solid plasticizer; and (c) processing the first and second stabilized compositions to form a multi-layered product wherein the first composition forms a core layer for the product that comprises about 50 to 99 weight percent of the product and the second composition forms a cap layer for the product that comprises about 1 to about 50 weight percent of the product.

5. A method as defined in claim 4 wherein the core layer comprises from about 70 to about 95 weight percent of the product and the cap layer comprises from about 5 to about 30 weight percent of the product.

6. A method as defined in claim 4 wherein the first composition and the second composition further comprise, costablizers, plasticizers, lubricants, smoke suppressants, impact modifiers, UV stabilizers, fillers, pigments or any combination of the foregoing.

7. A method as defined in claim 4 wherein the first and second compositions are processed by coextruding the first and second compositions.

8. A premixed thermoplastic additive package comprising:

(i) 1,4-cyclohexane dimethanol dibenzoate;

(ii) a sodium zeolite with about 13 to 25% water content, a mean particle size of about 3 to 4 microns and an average pore size of about 3 to about 7 angstroms;

(iii) a heat stabilizer selected from the group consisting of mixed metal stabilizers, organotin stabilizers, lead stabilizers, metal free stabilizers, or any combination of the foregoing; and (iv) optionally costablizers, plasticizers, lubricants, smoke suppressants, impact modifiers, UV stabilizers, fillers, pigments or any combination of the foregoing, wherein the amount of 1,4-cyclohexane dimethanol dibenzoate present in the additive package will produce a thermoplastic composition comprising an antiplasticizing amount of 1,4-cyclohexane dimethanol dibenzoate which is less than 3% of the total weight of the composition but more than zero weight percent; the amount of sodium zeolite in the additive package will produce a thermoplastic composition comprising from about 0.05 % to about 12% of the total weight of the composition; and the amount of heat stabilizer in the additive package will produce a thermoplastic composition comprising from about 0.2% to about 12% of the total weight of the composition when the additive package is combined with a chlorine containing organic polymer selected from the group consisting of polyvinyl chloride, polyvinylidene chloride, polyvinyl chloride homopolymers, vinyl chloride copolymers, chlorinated polyvinyl chloride homopolymers, chlorinated polyvinyl chloride copolymers, and any combination of the foregoing.

* * * * *